United States Patent
Tischhauser

(10) Patent No.: US 8,015,778 B2
(45) Date of Patent: Sep. 13, 2011

(54) METHOD FOR FILLING CONTAINERS WITH PIECE GOODS

(75) Inventor: Reto Tischhauser, Eichenau (DE)

(73) Assignee: Robert Bosch GmbH, Stuttgart (DE)

( * ) Notice: Subject to any disclaimer, the term of this patent is extended or adjusted under 35 U.S.C. 154(b) by 109 days.

(21) Appl. No.: 12/308,903

(22) PCT Filed: Jul. 4, 2006

(86) PCT No.: PCT/EP2006/063838
§ 371 (c)(1),
(2), (4) Date: Dec. 29, 2008

(87) PCT Pub. No.: WO2008/003350
PCT Pub. Date: Jan. 10, 2008

(65) Prior Publication Data
US 2009/0320416 A1   Dec. 31, 2009

(51) Int. Cl.
  B65B 3/24   (2006.01)
  B65B 5/10   (2006.01)
  B65G 65/16  (2006.01)
(52) U.S. Cl. ............. 53/475; 53/393; 53/253; 414/270; 414/285
(58) Field of Classification Search ............ 53/473, 53/475, 393, 235, 237, 239, 240, 244, 246, 53/250, 251, 252, 253; 414/268, 269, 270, 414/285
See application file for complete search history.

(56) References Cited

U.S. PATENT DOCUMENTS

| | | | | |
|---|---|---|---|---|
| 4,996,820 A | * | 3/1991 | Harrison, Jr. | 53/69 |
| 5,040,056 A | * | 8/1991 | Sager et al. | 348/88 |
| 5,256,029 A | * | 10/1993 | Fluck | 414/792.9 |
| 5,501,064 A | * | 3/1996 | Ingram et al. | 53/473 |
| 5,553,442 A | * | 9/1996 | Fadaie | 53/445 |
| 6,011,998 A | * | 1/2000 | Lichti et al. | 700/230 |
| 6,105,338 A | * | 8/2000 | Kalany et al. | 53/252 |
| 6,122,895 A | * | 9/2000 | Schubert | 53/55 |
| 6,799,411 B2 | * | 10/2004 | Gasser et al. | 53/251 |
| 6,826,444 B2 | * | 11/2004 | Herzog | 700/213 |
| 6,901,726 B2 | * | 6/2005 | Huppi et al. | 53/473 |
| 7,540,369 B2 | * | 6/2009 | Momich | 198/418 |
| 2001/0049923 A1 | * | 12/2001 | Huppi et al. | 53/473 |
| 2003/0037515 A1 | * | 2/2003 | Herzog | 53/473 |
| 2003/0150193 A1 | * | 8/2003 | Gasser et al. | 53/473 |
| 2003/0182898 A1 | * | 10/2003 | Huppi et al. | 53/251 |
| 2004/0099467 A1 | * | 5/2004 | Doake et al. | 180/400 |
| 2005/0241494 A1 | * | 11/2005 | Davi et al. | 99/443 C |
| 2009/0012644 A1 | * | 1/2009 | Stifter | 700/216 |

FOREIGN PATENT DOCUMENTS

DE    4208818 A1    9/1993

(Continued)

*Primary Examiner* — Paul R Durand

(74) *Attorney, Agent, or Firm* — Ronald E. Greigg

(57) ABSTRACT

In a method for filling bulk goods into containers designed to accommodate a certain number of bulk items, at least one bulk goods conveyor is used to transport the bulk goods towards at least two pickers which are consecutively arranged in the direction of transport. The pickers are used to fill the bulk goods into empty spaces in containers, transported on at least one container conveyor. When the supply of bulk goods decreases or is discontinued, the at least one picker arranged downstream in the direction of transport of the bulk goods conveyor gives preference to containers with a high filling level. Completely empty containers are preferably no longer filled. Thus the bulk goods conveyor can be emptied within a short period and almost all bulk goods are packed without necessitating manual filling of the containers.

20 Claims, 5 Drawing Sheets

FOREIGN PATENT DOCUMENTS

| | | |
|---|---|---|
| EP | 0749902 A1 | 12/1996 |
| EP | 1285851 A1 | 2/2003 |
| EP | 1593598 A2 | 11/2009 |
| FR | 2754239 A1 | 4/1998 |

* cited by examiner

METHOD FOR FILLING CONTAINERS WITH PIECE GOODS

CROSS-REFERENCE TO RELATED APPLICATION

This application is a 35 USC 371 application of PCT/EP 2006/063838 filed on Jul. 4, 2006.

BACKGROUND OF THE INVENTION

1. Technical Field

The invention relates to a method for filling containers with piece goods, as recited in the preamble to claim 1.

2. Description of the Prior Art

Piece goods, which are delivered from production systems via supply conveyors to a packaging line can be placed into the provided containers in a fully automatic fashion by means of robots. EP 0 250 470 has disclosed robots of this kind, also referred to as pickers or delta robots, which are suitable for use in packaging lines. It concerns a robot with a base body, which is linked by means of three two-part arms to a working part on which grippers or suction elements are provided. U.S. Pat. No. 6,543,987 and U.S. Pat. No. 6,896,473 have disclosed further developments in which the delta robot has a fourth axis that can be changed in length. In lieu of delta robots, there are also other suitable pick & place robots, for example the so-called Scara robot or the 6-axis robot.

Usually, piece goods and containers are transported on two or more supply conveyors extending parallel to one another; as the conveyors move continuously or incrementally, the pickers pick up the piece goods individually or in groups and place them into the containers.

EP 0 749 902 A describes a system in which the piece goods and the containers are transported in a parallel flow, i.e. parallel and in the same direction to each other. EP 0 865 465 A discloses a system using the counterflow principal, i.e. the container conveyors do in fact extend parallel to the piece goods conveyor, but in the opposite direction from the conveying direction of the piece goods conveyor.

EP 1 285 851 A proposes a method for increasing the service life and maximum duration of use of picker robots that are used along such picker lines, employing the parallel flow or counterflow principal. To accomplish this, the robots are controlled as a function of the arrangement of piece goods on the supply conveyor so that they are utilized as consistently as possible and are not subjected to intense power fluctuations.

In EP 1 352 831 A, the relative speed between the supply of the containers and the supply of the piece goods is controlled in the region of the picker line. The control of the relative speed here is carried out as a function of a fill level of at least one storage element. This method permits an efficient transfer of piece goods into containers while also assuring the most complete possible filling.

All of these methods, however, concern the normal operation of the system. It is always assumed that enough piece goods are supplied and that a shortage is rectified as soon as possible. At the end of production, e.g. in the event of a product change or format change, but also when the system is being cleaned or in the event of an unexpected breakdown in the piece goods production system, there are too few piece goods waiting on the supply conveyor to allow all of the containers on the container conveyor to be filled completely. Usually, the problem lies in the fact that at the time that the production process is stopped, the number of products still on the piece goods conveyor does not coincide with the number of placement positions or slots that remain to be filled in the container. But with the counterflow principal in particular, which also involves the products "traveling away" from the containers that remain to be filled, many of the containers are already partially filled. It is then no longer possible to fill these partially filled containers.

In the final control, incompletely filled containers are separated out as insufficiently meeting quality requirements, usually by means of a scale, and must be filled by hand or disposed of as waste. In addition, the last piece goods remaining on the piece goods conveyor must be cleared out by hand and disposed of. The quantity of rejected product is not insignificant. This also requires a sufficient amount of available personnel. If critical piece goods such as sponge cakes are being packaged, then it is not permissible for the partially filled containers to remain unprocessed for too long. This changeover procedure is time-consuming, particularly with frequent product changes, and reduces the productivity of the system.

OBJECT AND SUMMARY OF THE INVENTION

The object of the invention, therefore, is to create a method, which permits a fully automatic and optimized distribution of the piece goods remaining on the supply conveyor into the containers, or more precisely into the placement positions, in the event of an end of production, a shortage of piece goods, or some other interruption in the production.

In the method according to the invention for placing piece goods into placement positions, in particular containers, that accommodate a certain filling number of piece goods, the piece goods are supplied on at least one piece goods conveyor to at least two pickers situated one after the other in the conveying direction in order to be placed by means of these pickers into empty slots of the placement positions, in particular containers, that are supplied on at least one container conveyor. When the replenishing supply of piece goods decreases or fails to appear, the pickers work with a filling strategy that is changed in comparison to a normal operation in order to avoid partially filled placement positions, in particular containers, as much as possible. In other words, the pickers functions so that completely filled and entirely empty placement positions, in particular containers, leave the system, but no partially filled placement positions, in particular containers, or hardly any of them.

In one variant of the according to the invention, the at least one picker situated upstream in the conveying direction of the container conveyor preferably fills containers with a high filling level. Completely empty containers are preferably no longer filled.

It is therefore possible, within an extremely short period of time, to produce as many completely filled containers as possible using the piece goods remaining on the piece goods conveyor and to package as close as possible to all of the piece goods. This entails acceptance of the fact that between the filled containers, the container conveyor will also transport away individual empty containers for further processing. These empty containers can be removed from the further processing without requiring disposal of piece goods or their transfer to other containers.

Alternatively or in addition to the above-mentioned variant, the at least one picker situated downstream in the conveying direction of the container conveyor preferably transfers piece goods of one partially filled container into another partially filled container. In this case, the decision as to whether piece goods should be taken from or placed into a first container preferably takes into account the number of piece goods in this first container and the sum of all piece goods in other containers simultaneously situated in the working range of the at least one upstream picker. Usually, if there are enough piece goods remaining in the other containers to completely fill the first container, then the first container is filled. If there are not enough piece goods in the other containers to completely fill the first container, then the piece goods are removed from the first container. The first container is preferably the container within the working range that is situated the farthest downstream in the conveying direction of the container conveyor, i.e. the container that will be the first to exit the container conveyor.

Tests have shown that it is possible to empty out a piece goods conveyor within a few minutes, in particular within 10 minutes. It is no longer necessary to complete the filling of the containers by hand. Hardly any piece goods remain on the piece goods conveyor, ideally, fewer than are required to completely fill one container. It takes hardly any time at all to then clear out the piece goods conveyor.

Preferably the operation is carried out at a reduced conveyor speed. It can, however, also be carried out at full conveyor speed, at a high conveyor speed, or at a continuously decreasing speed.

BRIEF DESCRIPTION OF THE DRAWINGS

A preferred exemplary embodiment of the subject of the invention, will be explained below in conjunction with the accompanying drawings, in which.

DESCRIPTION OF THE PREFERRED EMBODIMENTS

Figure 1:
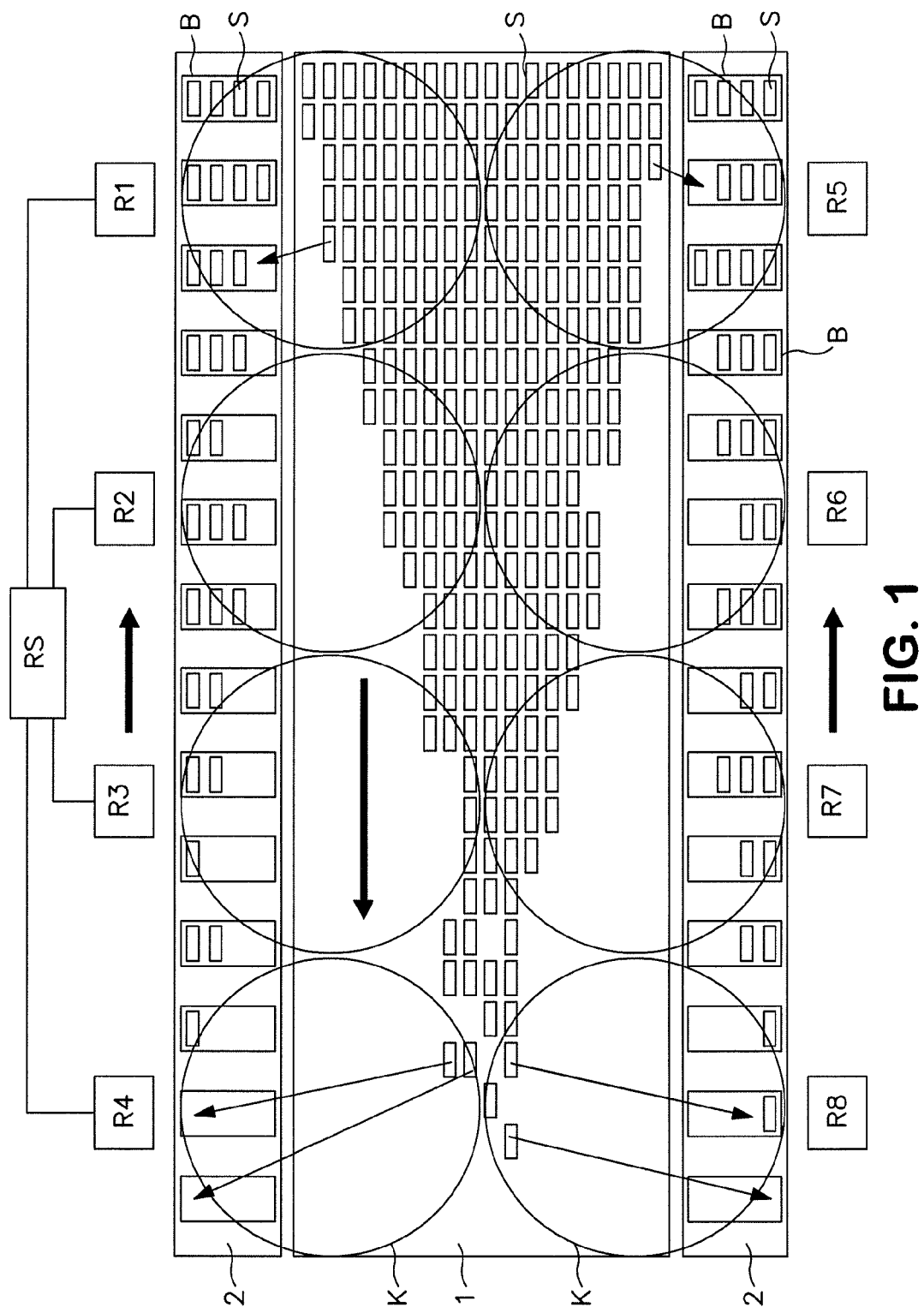
FIG. 1 is a schematic depiction of a part of a packaging system with container conveyors, piece goods conveyors, and a plurality of robots, during normal operation according to the prior art, using the counterflow principal.

FIG. 1 schematically depicts a packaging system of a known type. It has one or more conveyors 1, 2 for containers B and piece goods S, sections of which preferably extend parallel to one another and in a horizontal plane, at least in some sections.

In the case of the piece goods or individual products, the conveyors 1, 2 are preferably endlessly revolving conveyor belts or in the case of the containers, the conveyors 1, 2 are endlessly revolving driver chains. It is, however, also possible to use other known conveyor types. In the example shown here, one horizontally extending piece goods conveyor 1 and two horizontally extending container conveyors 2 are provided. The container conveyors 2 are situated on both sides of the piece goods conveyor 1 and preferably extend in the same plane as the piece goods conveyor 1. The transport or conveying directions of the individual conveyors 1, 2 are indicated by large black arrows. In this example, the system functions in accordance with the counterflow principal.

Individual grasping units R1-R8 are situated in sequence along the conveying section. The grasping units are preferably picker robots, in particular delta robots of the type mentioned at the beginning, which can pick up piece goods individually and place them into the containers. It is also possible, however, to use other grasping and transferring units, provided that they are able to execute the required movements described below. Preferably, the grasping elements of the grasping units are able to move within a range in two-dimensional and preferably three-dimensional space. Depending on the type of piece goods to be packaged, it is also possible to use grasping units that are able to pick up the piece goods in groups and place them together into the containers.

The number of robots to be used depends on the desired capacity of the system and is not essential to the invention here. The only limitation to their number is that there must be at least two of them. Depending on the arrangement and number of conveyors, it is also possible for the pickers R1 through R8 to be distributed in a different way. They can, for example, all be situated on one side of the transport section. They can also be lined up on two opposite sides of the transport section; in this case, they can each have a neighboring picker situated directly opposite them or they can each be situated offset from the opposing pickers. In the example shown here, four robots are situated on each side: the robots R1 through R4 on a first side along a first container conveyor 2 and the robots R5 through R8 on the second side along a second container conveyor 2. The individual robots are essentially identical. Their working ranges K are each depicted with a respective circle. The circles K can also overlap one another or be spaced apart from one another.

The robots R1 through R8 are connected to one another via a central control unit RS. In the figures, only the data lines from the robots R1 through R4 to the control unit RS are shown. Naturally, the remaining robots R5 through R8 are also connected to the central control unit. The robots R1 through R8 can also be connected to one another directly in addition to or in lieu of their individual lines leading to the control unit.

If robots are used, then usually, the central control unit only provides them with the information relating to the fill level of the individual containers and the arrangement of piece goods on the piece goods conveyor 1. The decision as to which piece goods item the respective robot will pick up next and which container it will be placed into is handled by the local robot control unit itself. This decision, however, is communicated to the central control unit RS in order to thus inform the other robots. So that these pieces of information can be exchanged with the least possible amount of calculation effort and therefore with the greatest possible speed, the whole product belt and the containers are preferably divided into one or more matrices or vectors for use in queues, with each possible position occupying a position in the matrix or being stored in the vectors. The positions, i.e. the x/y coordinates, of all piece goods are recorded by means of image processing. The strategy according to which the robot decides which piece goods item it should pick from those situated within the working range is essentially based on a queue that is established in accordance with certain criteria (e.g. distance of the individual products from a virtual line in the working range). In this context, it is immaterial whether the piece goods are transported on the piece goods conveyor in a sorted fashion or an unsorted fashion. To be precise, the position of the actual piece goods is optically detected, preferably at the upstream or starting end of the piece goods conveyor, and transmitted to the central control unit RS. It is also possible, but not necessary, to repeat the optical detection of the fill level of the containers at predetermined positions during their transport and to convey this information to the central control unit RS. Other types of product detection and control of the robots are possible.

During normal operation, which is shown in FIG. 1, the piece goods conveyor 1 is sufficiently stocked with piece goods S so that all of the containers B can be completely filled. The filling can be carried out using an extremely wide range of filling strategies. Preferably, the strategy described in EP 1 285 851 is used. In addition, in the counterflow method, those robots within whose working circles K a very large number of piece goods are situated, i.e. which are situated toward the upstream end of the piece goods conveyor, selectively give preference to filling individual holes in the already partially filled containers. But the robots past which a sparse number of piece goods flows, i.e. robots which are situated toward the downstream end of the piece goods conveyor, only attempt to fill every container as well as possible, preferably evenly. In all instances, the fill level of the individual containers B continuously increases during transport through the filling section. This achieves the highest possible efficiency and packaging capacity of the system during normal operation. In this mode, only piece goods from the piece goods conveyor or optionally from a piece goods hopper, are placed into the containers. During normal operation, there is no transfer of piece goods within or between the containers.

If there is a subsequent stoppage or dramatic decrease in the piece goods flow or product flow, then this is detected by the optical detection unit at the entry end of the supply conveyor or by the central control unit RS. If the flow of piece goods does not increase again after a predetermined interval of time, then the central control unit RS switches to the filling strategy according to the invention. The goal of the novel filling strategy is to prevent—to the greatest extent possible—containers that are only partially filled from exiting the system. This change in the strategy can also occur directly in the individual robots as soon as they have been notified of a drop in the number of piece goods that last longer than a predetermined time or if the incoming number of piece goods remains below a minimum value over a predetermined interval of time. The minimum value can be the same or different for the individual robots.

If at a later point, more piece goods arrive into the packaging section on the piece goods conveyor, then the central control unit or the individual robots will automatically switch back to normal operation.

Figure 2:
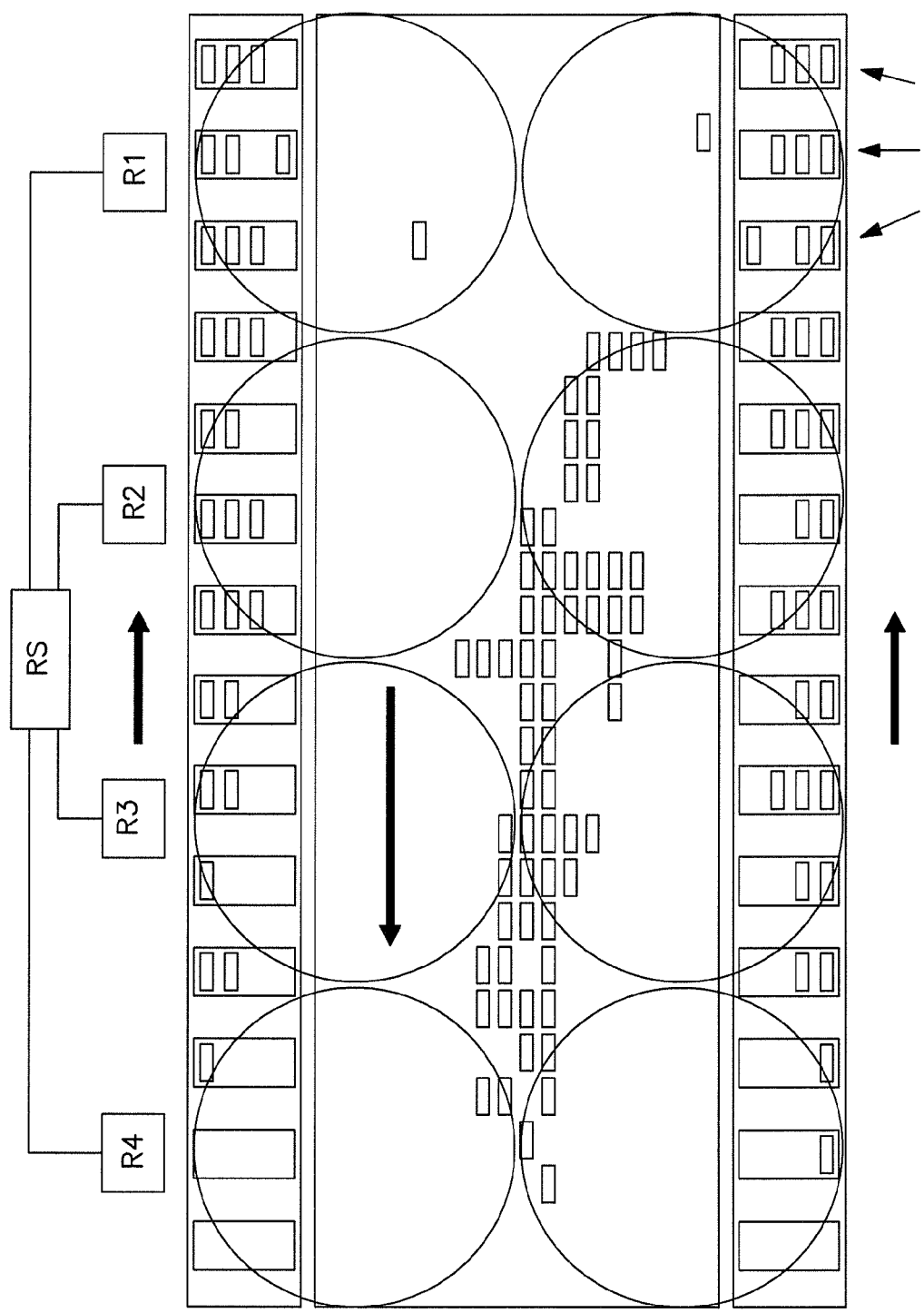
FIG. 2 shows the packaging system according to FIG. 1, shortly after the end of production.
Figure 3:
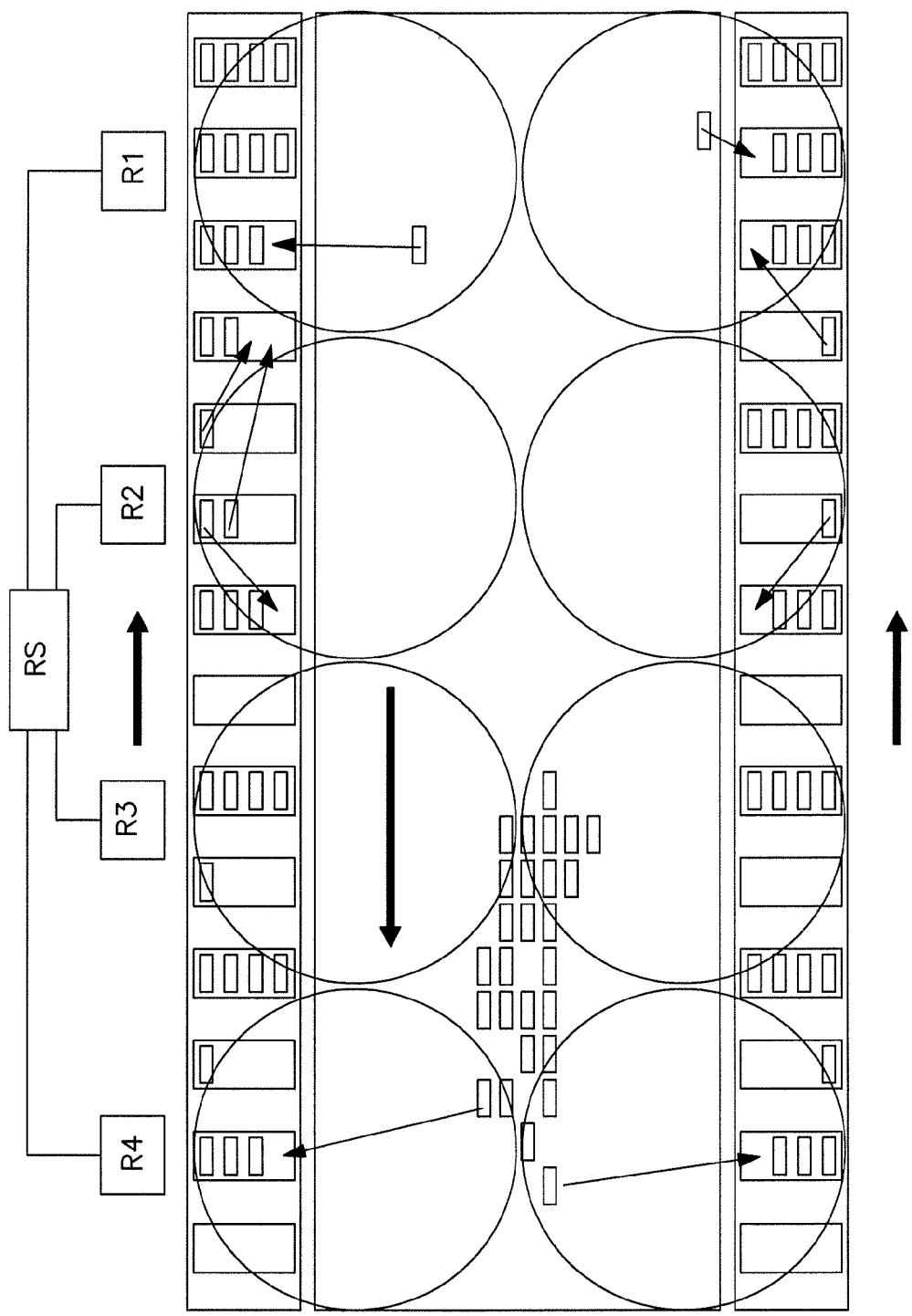
FIG. 3 shows the packaging system according to FIG. 1, at a later point in time.
Figure 4:
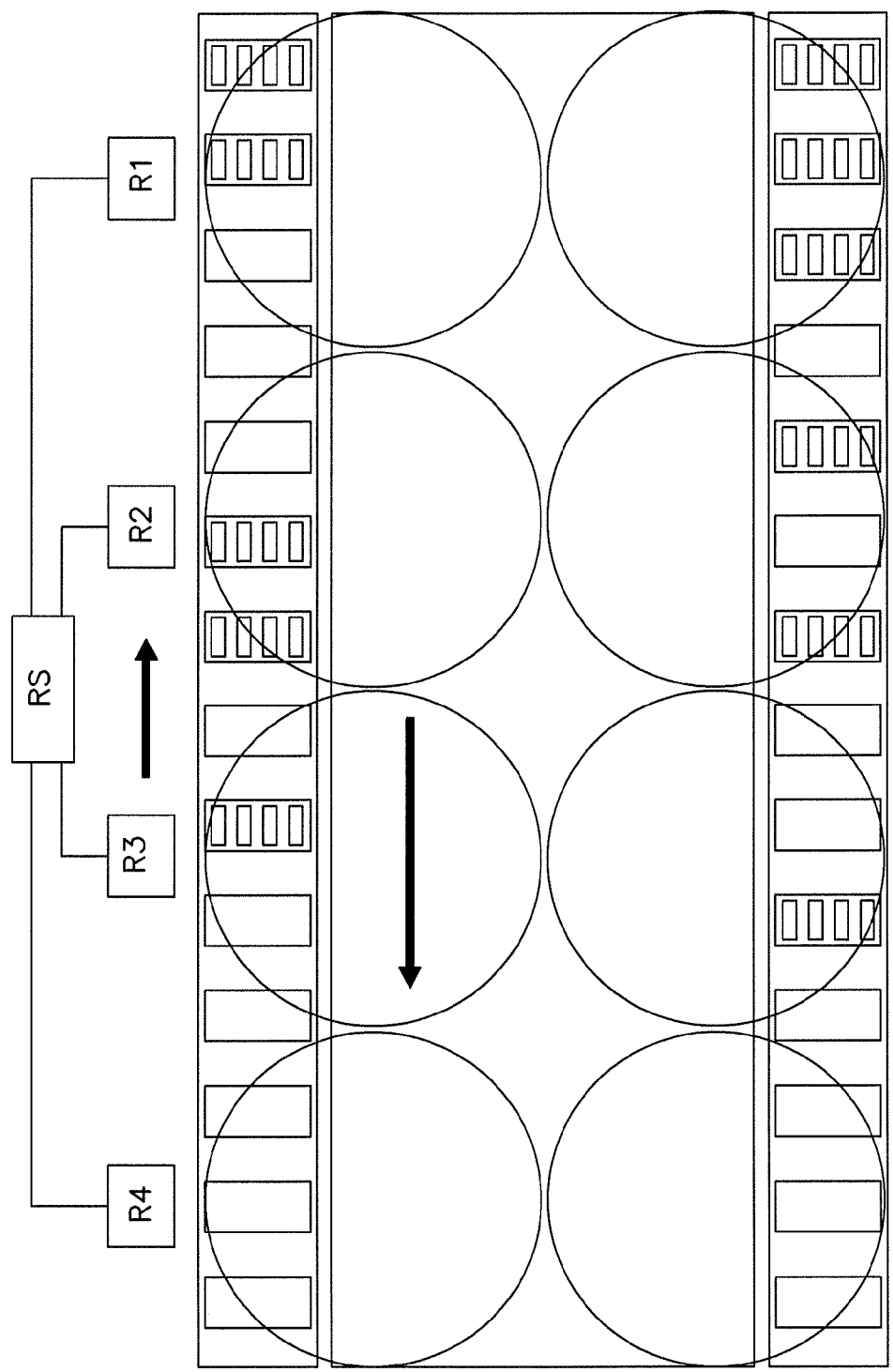
FIG. 4 shows the packaging system according to FIG. 1, after all of the piece goods have been packaged.

The filling strategy according to the invention for approximately complete emptying of the piece goods conveyor belt occurs as follows:

The conveying speeds of the piece goods conveyor and the container conveyors are reduced, for example, to 60% in comparison to normal operation. The robots situated downstream change their filling strategy so that now, they give preference to filling containers that are almost full. In other words, these robots essentially do what the upstream robots have been doing during normal operation; by contrast with them, however, they ignore empty containers and no longer attempt to fill them. Remember: during normal operation, the downstream robots have given preference to the containers that were filled the least, in order to achieve the most uniform possible increase in the fill level of the containers and therefore to achieve the most constant possible conveying speed of the container transport. In the changed strategy, the robot or robots situated the farthest upstream begin(s) to transfer piece goods from one container into another container. This transfer process is indicated by small arrows in FIGS. 2 and 3. As a result, essentially only completely filled and completely empty containers exit the filling section, as shown in FIG. 4.

In a preferred variant of the method, the at least one robot, which transfers the piece goods from one container into the other, counts and takes into consideration the number of piece goods in the first container and the sum of all piece goods in the subsequent containers that are situated within its working circle K. If there are enough piece goods in the subsequent containers to fill the first container, then the robot fills it by transferring these piece goods from the subsequent containers to the first container. If there are not enough piece goods, then if possible, the robot takes all of the piece goods from the first container and transfers them into subsequent containers. If it can use a piece goods item from the piece goods conveyor in order to fill a container even more completely, then it takes piece goods from the piece goods conveyor as well, but does not give preference to doing so. If there are too many piece goods in the containers in order to completely empty or completely fill the containers situated within the working circle K of the last robot(s), then these surplus piece goods are placed back onto the piece goods conveyor in order to be picked up again further downstream.

During the emptying process, pickers that are situated between a picker situated the farthest downstream and a picker situated the farthest upstream preferably switch from the filling strategy of the picker farthest downstream to the filling strategy of the picker farthest upstream, depending upon the amount of piece goods still on the piece goods conveyor. In other words, first, they fill the containers and at the end, when there are almost no piece goods left on the piece goods conveyor, they rearrange the piece goods in the containers. In this context, they can all change their filling strategies in unison or they can change their filling strategies one after another.

During the emptying process, it is also possible for all of the pickers or at least the pickers situated the farthest upstream to take piece goods from already partially filled containers and put them back onto the piece goods conveyor.

This emptying process requires only a few minutes in order to empty the piece goods conveyor to the greatest possible extent and to allow the containers to exit the container conveyor in either the completely filled or the completely empty state. This situation is shown in FIG. 4.

Figure 5:
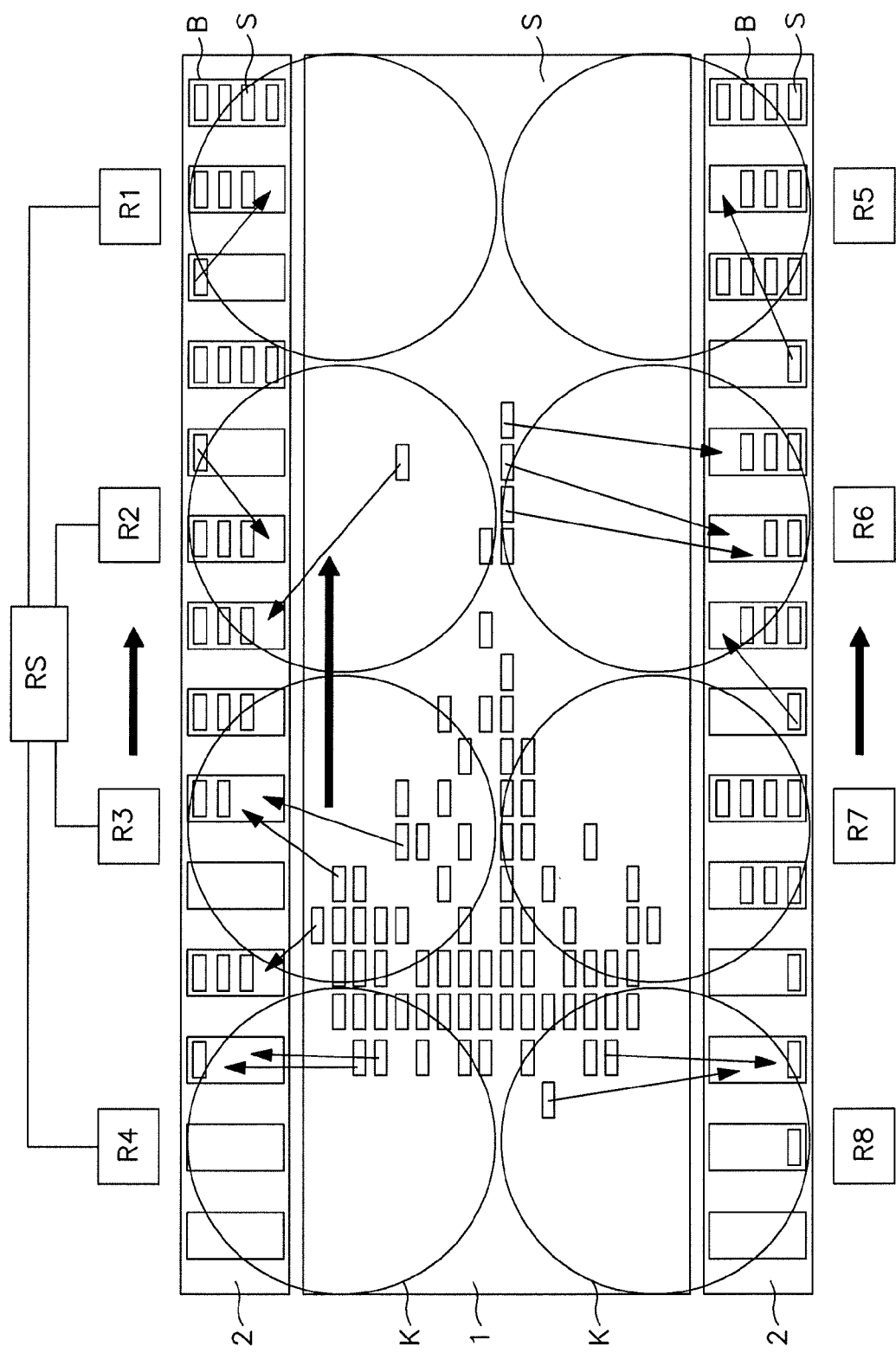
FIG. 5 is a schematic depiction of a part of a packaging system according to the invention, with container conveyors, piece goods conveyors, and a plurality of robots, after the end of production, which functions in accordance with the counterflow principal.

The method according to the invention has been explained in conjunction with a system working in counterflow. It can also be used, however, in a system that operates with parallel flow, as shown in FIG. 5. In this case, the upstream robots primarily give preference to the full containers and continue to place individual piece goods into them. The robots situated downstream then almost exclusively transfer the piece goods situated in only partially filled containers into other containers. In the parallel flow method, the probability that a product will still be on the piece goods conveyor is lower for the robots situated downstream. In this case, the middle robots first adopt the strategy of the upstream robots and then adopt the strategy of the downstream robots, depending on how many piece goods are still present in their vicinity.

If one compares the above-described strategies in the emptying of the system in the case of the counterflow and in the case of the parallel flow, it is evident that in both cases, the transfer process occurs in the containers that exit the container conveyor first, i.e. the containers situated the farthest downstream in the conveying direction of the container conveyor, while the containers that come into the system last, i.e. the containers situated the farthest upstream in the conveying direction of the container conveyor, are either filled as completely as possible or are completely emptied.

Diverse variants of the method are possible. In parallel flow, it is also possible to use the same conveyor as a piece goods conveyor and a container conveyor. In this case, the piece goods can also be resorted or grouped on the same belt. In lieu of containers, it is also possible for items to be placed into cavities or partitioned compartments of chains or into other placement positions. In addition, the piece goods do not have to be placed next to one another, but can also be stacked on top of one another. When the term "containers" is used in the text and in the claims, this is also intended to mean and include other types of definite placement positions.

The foregoing relates to the preferred exemplary embodiments of the invention, it being understood that other variants and embodiments thereof are possible within the spirit and scope of the invention, the latter being defined by the appended claims.

The invention claimed is:

1. A method for inserting piece goods into placement positions in containers, that accommodate a certain fill number of piece goods, comprising the steps of:
supplying the piece goods on at least one piece goods conveyor to at least two pickers situated one after another in a conveying direction in order;
inserting the piece goods by means of the at least two pickers into empty placement positions in containers which are supplied on at least one container conveyor;
working the at least two pickers during a normal operation according to a filling strategy; and
changing the filling strategy of at least one of the at least two pickers in comparison to a normal operation when a supply of piece goods decreases or fails to appear in order to avoid partially filled containers and permit the occurrence of completely empty containers.

2. The method as recited in claim 1, wherein the step of changing the filling strategy comprises the step of having at least one picker situated upstream in a conveying direction of the at least one container conveyor filling containers that have a high fill level and no longer filling completely empty containers.

3. The method as recited in claim 1, wherein at least one picker situated downstream in a conveying direction of the at least one container conveyor preferably transfers piece goods from one partially filled container into another partially filled container.

4. The method as recited in claim 3, wherein the at least one picker situated downstream in the conveying direction of the at least one container conveyor places piece goods transported on the at least one piece goods conveyor into the containers.

5. The method as recited in claim 3, wherein pickers that are situated between a picker situated farthest upstream in the conveying direction of the at least one container conveyor and a picker situated farthest downstream switch from the filling strategy of the picker farthest upstream to the filling strategy of the picker farthest downstream, depending upon the amount of piece goods remaining on the at least one piece goods conveyor.

6. The method as recited in claim 3, wherein a decision as to whether piece goods are taken from a first container or placed into the first container takes into account the number of piece goods in the first container and the sum of all piece goods in other containers simultaneously situated in a working range of the at least one picker situated downstream in the conveying direction of the at least one container conveyor.

7. The method as recited in claim 6, wherein the first container is the container within the working range that is situated farthest downstream in the conveying direction of the at least one container conveyor.

8. The method as recited in claim 6, wherein the at least one picker situated downstream in the conveying direction of the at least one container conveyor places piece goods transported on the at least one piece goods conveyor into the containers.

9. The method as recited in claim 6, wherein if there are enough piece goods in the other containers to completely fill the first container, then the first container is filled, but if there are not enough piece goods in the other containers to completely fill the first container, then the piece goods are removed from the first container.

10. The method as recited in claim 9, wherein the first container is the container within the working range that is situated farthest downstream in the conveying direction of the at least one container conveyor.

11. The method as recited in claim 9, wherein the at least one picker situated downstream in the conveying direction of the at least one container conveyor places piece goods transported on the at least one piece goods conveyor into the containers.

12. The method as recited in claim 11, wherein pickers that are situated between a picker situated farthest upstream in the conveying direction of the at least one container conveyor and a picker situated farthest downstream switch from the filling strategy of the picker farthest upstream to the filling strategy of the picker farthest downstream, depending upon the amount of piece goods remaining on the at least one piece goods conveyor.

13. The method as recited in claim 1, wherein the piece goods are taken from already partially filled containers and placed back onto the at least one piece goods conveyor.

14. The method as recited in claim 1, wherein the at least one piece goods conveyor and the at least one container conveyor operate at full speed or at a reduced speed.

15. The method as recited in claim 1, wherein the conveying direction of the at least one piece goods conveyor extends parallel to, but in an opposite direction from the conveying direction of the at least one container conveyor.

16. The method as recited in claim 1, wherein the conveying direction of the at least one piece goods conveyor extends parallel to and in a same direction as the conveying direction of the at least one container conveyor.

17. The method as recited in claim 1, wherein a horizontally extending conveyor belt is used as the at least one piece goods conveyor.

18. A method for inserting piece goods into placement positions in containers, that accommodate a certain fill number of piece goods, comprising the steps of:
supplying the piece goods on at least one piece goods conveyor to at least two pickers situated one after another in a conveying direction in order;
inserting the piece goods by means of the at least two pickers into empty placement positions in containers which are supplied on at least one container conveyor;
working the at least two pickers during a normal operation according to a filling strategy; and
changing the filling strategy in comparison to a normal operation when a supply of piece goods decreases or fails to appear in order to avoid partially filled containers, wherein the step of changing the filling strategy comprises the step of having at least one picker situated upstream in a conveying direction of the at least one container conveyor filling containers that have a high fill level and no longer filling completely empty containers, and wherein at least one picker situated downstream in the conveying direction of the at least one container conveyor transfers piece goods from one partially filled container into another partially filled container.

19. The method as recited in claim 18, wherein a decision as to whether piece goods are taken from a first container or placed into the first container takes into account the number of piece goods in the first container and the sum of all piece goods in other containers simultaneously situated in a working range of the at least one picker situated downstream in the conveying direction of the at least one container conveyor.

20. The method as recited in claim 19, wherein if there are enough piece goods in the other containers to completely fill the first container, then the first container is filled, but if there are not enough piece goods in the other containers to completely fill the first container, then the piece goods are removed from the first container.

* * * * *